(12) United States Patent
Walther et al.

(10) Patent No.: US 8,898,264 B1
(45) Date of Patent: Nov. 25, 2014

(54) LINKING BUSINESS OBJECTS AND DOCUMENTS

(75) Inventors: Michael H. Walther, Pleasanton, CA (US); Viktor Gavrysh, Richmond Hill (CA); Sachin B. Chaudhari, Oakland, CA (US)

(73) Assignee: EMC Corporation, Hopkinton, MA (US)

( * ) Notice: Subject to any disclaimer, the term of this patent is extended or adjusted under 35 U.S.C. 154(b) by 258 days.

(21) Appl. No.: 11/473,538

(22) Filed: Jun. 22, 2006

(51) Int. Cl.
  *G06F 15/16* (2006.01)

(52) U.S. Cl.
  USPC .......................................................... 709/223

(58) Field of Classification Search
  USPC .......................................................... 709/223
  See application file for complete search history.

(56) References Cited

U.S. PATENT DOCUMENTS

| | | | |
|---|---|---|---|
| 6,098,081 A * | 8/2000 | Heidorn et al. ............... | 715/200 |
| 6,363,435 B1 | 3/2002 | Fernando et al. | |
| 7,151,438 B1 | 12/2006 | Hall et al. | |
| 7,403,989 B2 | 7/2008 | Beringer et al. | |
| 7,496,687 B2 | 2/2009 | Griffin et al. | |
| 7,512,597 B2 * | 3/2009 | Akilov et al. ......................... | 1/1 |
| 2002/0052980 A1 | 5/2002 | Sanghvi et al. | |
| 2002/0095418 A1* | 7/2002 | Honda et al. ..................... | 707/10 |
| 2002/0118220 A1 | 8/2002 | Lui et al. | |
| 2002/0165784 A1 | 11/2002 | Taggart et al. | |
| 2003/0078942 A1 | 4/2003 | Childress et al. | |
| 2003/0109938 A1 | 6/2003 | Daum et al. | |
| 2003/0126136 A1 | 7/2003 | Omoigui | |
| 2003/0154232 A1 | 8/2003 | Beringer et al. | |
| 2003/0187956 A1 | 10/2003 | Belt et al. | |
| 2003/0204429 A1 | 10/2003 | Botscheck et al. | |
| 2004/0002887 A1 | 1/2004 | Fliess et al. | |
| 2004/0017395 A1 | 1/2004 | Cook | |
| 2004/0049589 A1 | 3/2004 | Papanikolaou et al. | |
| 2004/0068527 A1 | 4/2004 | Smith, III | |
| 2004/0068714 A1 | 4/2004 | Deimel et al. | |
| 2004/0073531 A1* | 4/2004 | Patterson .......................... | 707/1 |
| 2004/0177319 A1* | 9/2004 | Horn .......................... | 715/501.1 |
| 2004/0210452 A1 | 10/2004 | Aboujaoude et al. | |
| 2004/0225718 A1 | 11/2004 | Heinzel et al. | |
| 2004/0243422 A1 | 12/2004 | Weber et al. | |
| 2004/0243577 A1 | 12/2004 | Choudhary et al. | |
| 2005/0055337 A1 | 3/2005 | Bebo et al. | |
| 2005/0060721 A1 | 3/2005 | Choudhary et al. | |
| 2005/0120292 A1* | 6/2005 | Suzuki ....................... | 715/501.1 |
| 2005/0198042 A1* | 9/2005 | Davis .............................. | 707/10 |
| 2006/0017975 A1 | 1/2006 | Ly et al. | |
| 2006/0085412 A1* | 4/2006 | Johnson et al. ................... | 707/4 |
| 2006/0161672 A1 | 7/2006 | Jolley et al. | |
| 2006/0174093 A1 | 8/2006 | Jolley et al. | |
| 2006/0242249 A1 | 10/2006 | Swanson et al. | |
| 2006/0248045 A1 | 11/2006 | Toledano et al. | |
| 2007/0261063 A1 | 11/2007 | Matousek et al. | |

OTHER PUBLICATIONS

Berners-Lee. RFC 1866: Hypertext Markup Language 2.0. 1995.*

(Continued)

*Primary Examiner* — Bryan Lee
(74) *Attorney, Agent, or Firm* — Van Pelt, Yi & James LLP

(57) ABSTRACT

Managing content is disclosed. An indication is received that a content item comprising a body of managed content is associated with a business object not included in the body of managed content. The content item is linked with the business object.

20 Claims, 10 Drawing Sheets

(56) References Cited

OTHER PUBLICATIONS

Pemberton et al. "HLink: Link recognition for the XHTML Family". Sep. 2002.*

Priebe et al. "Towards Inegrative Enterprise Knowledge Portals". Nov. 2003. ACM.*

Priebe et al. "Ontology-based Inegration of OLAP and Information Retrieval". 2003 IEEE.*

Open Text Corporation, Livelink ECM—DocuLink for SAP® Solutions, Data Sheet 2006.

Et-Beltagy et al., Linking in Context, Journal of Digital Information, vol. 2, Issue 3, Article No. 90, Mar. 12, 2008, pp. 151-160.

* cited by examiner

LINKING BUSINESS OBJECTS AND DOCUMENTS

BACKGROUND OF THE INVENTION

Enterprise portals typically seek to provide users with a single point of access to multiple resources such as information and services. For example, in a business setting, employees may use enterprise portals to manage inventory, track finances, and review procedures, all through a unified interface such as by directing a browser to an intranet site. A portal includes components, referred to herein as portal applications.

Typically, business objects, such as inventory, customer lists, and engineering information are maintained by one component, such as a business information server. Documentation, such as product manuals, sales reports, and testing data is typically maintained by another component, such as a document management system. Complex queries are generally required to find documents in the document management system that are related to business objects in the business information server and vice versa. Therefore, it would be desirable to have a better way to locate relevant information.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
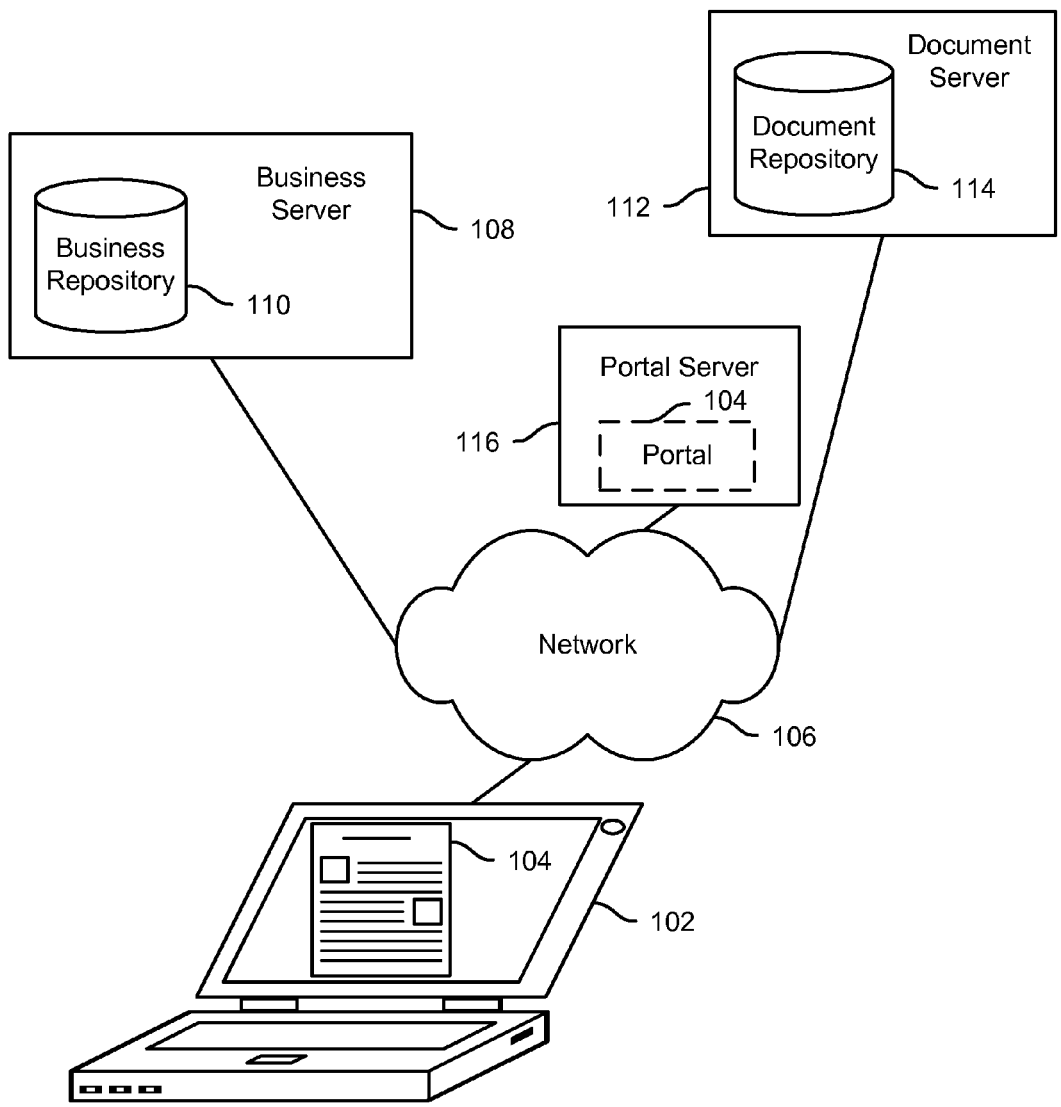
FIG. 1A illustrates an embodiment of a system for associating business information with documentation.

FIG. 1A illustrates an embodiment of a system for associating business information with documentation. In the example shown, client 102 accesses portal 104 via a browser, through network 106. Portal 104 is served by portal server 116 which draws content from business server 108 and document server 112, also through network 106. In various embodiments, network 106 is the Internet, a local area network, a wide area network, a wired network, a wireless network, or any other network that can enable a user to access portal 104.

Business server 108 includes a business repository 110 which stores, for example, plant management, engineering management, and supply chain management information, as well as related information such as accounting information, customer records, etc. (hereinafter referred to collectively as 'business information' and 'business objects').

Document server 112 is configured to store documents that support business information in document repository 114, as well as to provide interactive capabilities for those documents, such as the abilities to search, create, edit, and collaborate. As used herein, documents can include web pages, text files, multimedia files, and other content.

In the example shown, portal server 116 is an SAP Enterprise Portal server and business server 108 includes mySAP Enterprise Resource Planning software. Other portal servers and business servers, such as products made by Oracle and Siebel may be used and the techniques described herein adapted, as applicable. Document server 112 includes EMC Documentum software. In various embodiments, business repository 110 and/or document repository 114 are located on portal server 116 and business server 108 and document server 112, respectively, are omitted as appropriate.

Figure 1B:
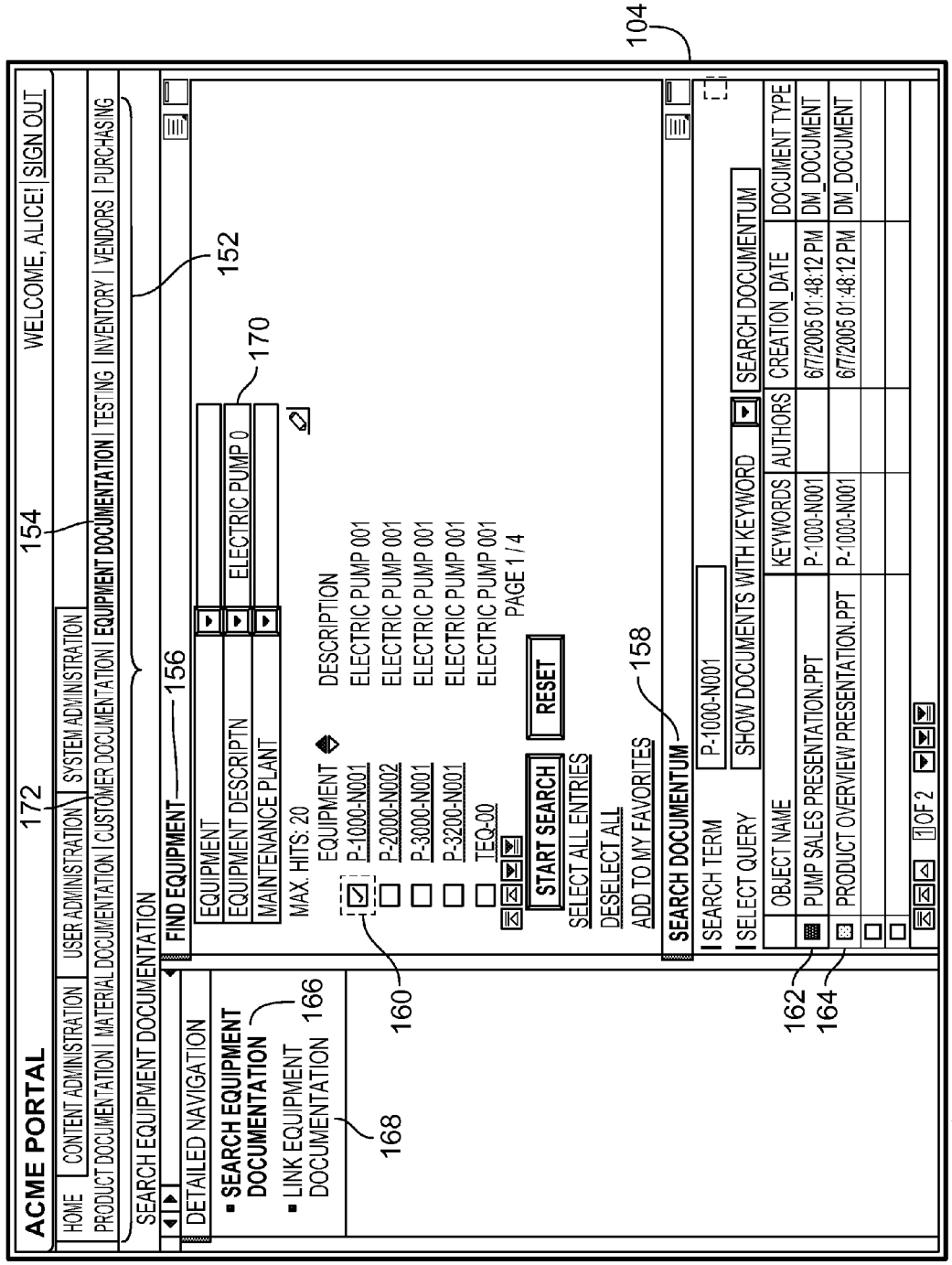
FIG. 1B illustrates an embodiment of an interface to a portal.

FIG. 1B illustrates an embodiment of an interface to a portal. The example shown is an implementation of a portion of portal 104, as rendered in a browser. A user, Alice, is logged into portal 104. Interface 150 includes a navigation bar 152 that provides access to various resources.

Suppose Alice, a recently hired engineer, has been assigned to redesign a pump having a model number of P-1000-N001. In the example shown, she has selected to 'search equipment documentation' (166) and is presented with a portal view that includes two applications—a business application displayed in region 156, and a document application displayed in region 158.

As shown, Alice has instructed portal 104 to display business information having an equipment description of 'electric pump 001' (170). Portal server 116 communicates with business server 108 to supply this information. As described in more detail below, by selecting checkbox 160 of region 156, Alice is automatically presented (in region 158) with documents stored in document repository 114 that are associated with pump P-1000-N001. Portal server 116 communicates with document server 112 to supply this information, including a sales presentation (162) and a product overview presentation (164).

As described in more detail below, documents 162 and 164 are linked with the pump P-1000-N001 business object. And, without having any knowledge of how document server 112 works or in what way documents are stored or retrieved from document repository 114, Alice's selection action (event) automatically causes the appropriate query to be performed.

Figure 2:
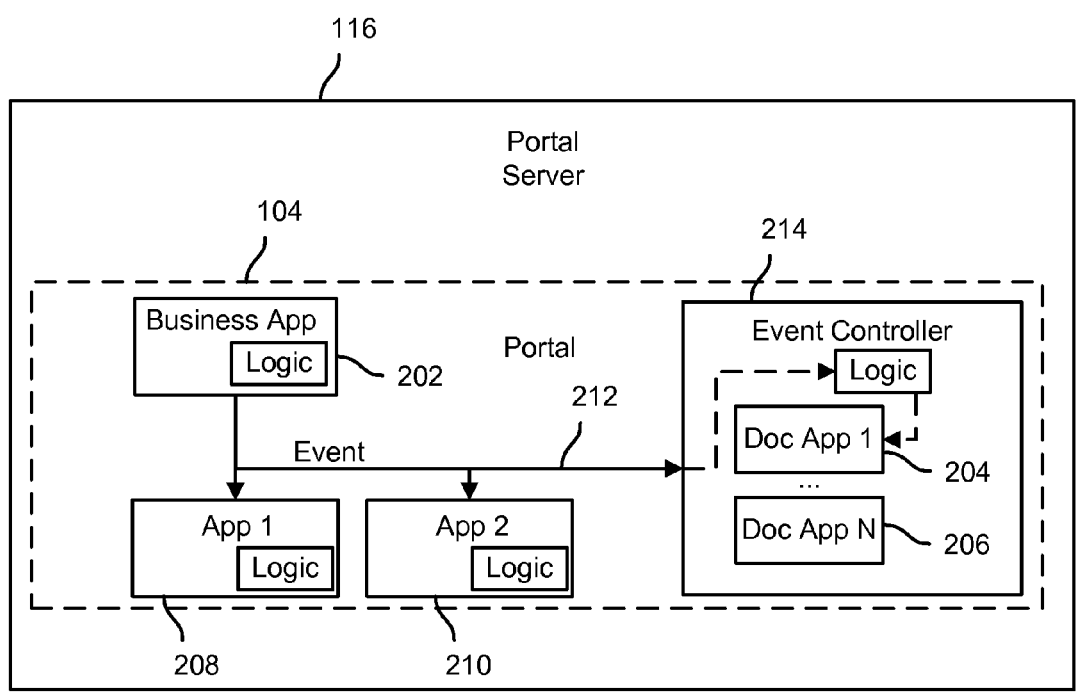
FIG. 2 illustrates an embodiment of a portal server.

FIG. 2 illustrates an embodiment of a portal server. Portal server 116 serves one or more portals, such as portal 104. Portal 104 includes a variety of portal applications. In the example shown, business application 202 provides business information about equipment, such as in which plants the equipment is manufactured, the parts (including current supply availability) required to manufacture the equipment, etc.

Document applications, such as document application 204 and 206 provide access to documents associated with equipment, such as invoices, product manuals, quality assurance data, etc. In some embodiments, a document application may comprise a content management system module configured to provide one or more content management functions with respect to a body of managed content, e.g., documents or other files or stored objects. As described in more detail below, other business information and related documents, such as information related to employees and processes may also be provided by business applications and document applications.

Additional applications, such as applications 208 and 210 may also be present in portal 104. In some embodiments, applications 208 and 210 are third party applications. In other embodiments, applications 208 and 210 are additional business applications, or are omitted.

A user interacts with portal 104, causing one or more events (also referred to herein as 'portal events') to occur. For example, when Alice selects checkbox 160, a selection event is broadcast (212) by business application 202. Business application 202 and applications 208 and 210 include logic to listen for and interpret broadcast events such as event 212. Event broadcasts typically include a key (such as P-1000-N001), a type to which the key belongs (such as 'product'), and what the event was (such as select).

An event controller 214 also contains logic to listen for and interpret broadcast events, such as event 212. However, rather than listening for events directly, document applications 204 and 206 receive event notification, if it all, via event controller 214. In some embodiments, event controller 214 also manages authentication, such as authenticating the portal user with the document application As used herein, the term 'document application' refers to any content management system, application, or process, or any component or module thereof or third party application configured to run thereon, or any other application, system, or process configured to perform one or more content management functions with respect to a body of documents and/or other stored content, such as a set of file system objects.

Figure 3:
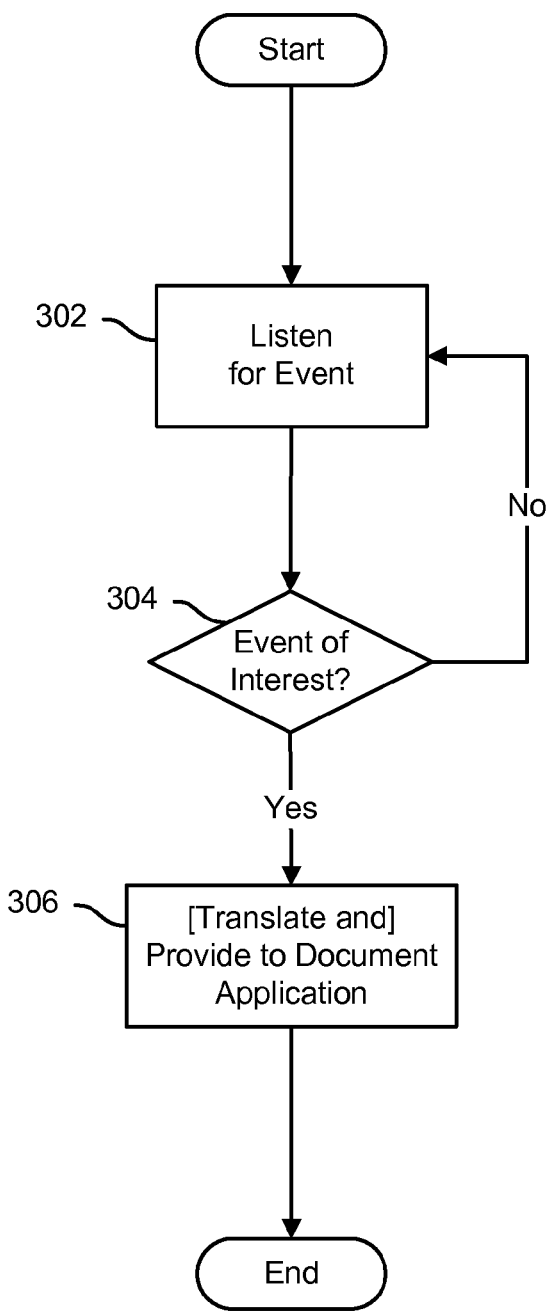
FIG. 3 is a flow chart illustrating an embodiment of a process for receiving an event.

FIG. 3 is a flow chart illustrating an embodiment of a process for receiving an event. In some embodiments the process of FIG. 3 is implemented by event controller 214. The process begins at 302 when an event is listened for.

When an event is detected, at 304 it is determined whether the event is of interest. An event is considered of interest if event controller 214 is configured to monitor for it. For example, event controller 214 can be configured to listen for broadcasts made by business application 202 and ignore all broadcasts made by portal application 208. Event controller 214 can also be configured to listen for only certain types of business applications. For example, event controller 214 may be configured to listen for events involving customers, but ignore events involving engineering management. Similarly, event controller 214 can be configured to listen for certain types of events (e.g., select, refresh, multiple select) and ignore others (e.g., delete).

In some embodiments, if the information broadcast in event 212 is readily understood by a document application the event is passed by event controller 214 through to the application without modification. Such may be the case, for example, with a 'page refresh' event that directs an application to redisplay the last information, if any, that it displayed in interface 150 of FIG. 1B. In other cases, translation or interpretation may be required. Suppose, for example, that Alice wishes to see all documents in document repository 114 that are related to pump P-1000-N001. As described in more detail below, when she checks checkbox 160 of FIG. 1B, a select event is broadcast. When event controller 214 receives notification of the event, at 306 it provides the payload of the select request to document application 206 which in turn uses the information supplied by event controller 214 to submit the appropriate query to document server 112. Thus, at 306, the received broadcast event is translated, if applicable, and provided to the appropriate document application(s).

In some embodiments, the logic of how to interpret the payload is centralized in event controller 214. If modifications are ever made, for example, to the manner in which document server 112 is interfaced, event controller 214 can be updated without having to also update document applications 204-206. Additionally, if new events are supported, such as for portal applications 208 and 210 to use, event controller 214 can be updated with logic to interpret those events without each document application 204-206 requiring an update. Similarly, by centralizing the logic of how to interpret the payload in event controller 214, third parties writing portal applications such as portal application 208, or custom modules to be added to document applications such as 204 and 206, need learn only how to interface with event controller 214, rather than a plurality of document applications.

Figure 4:
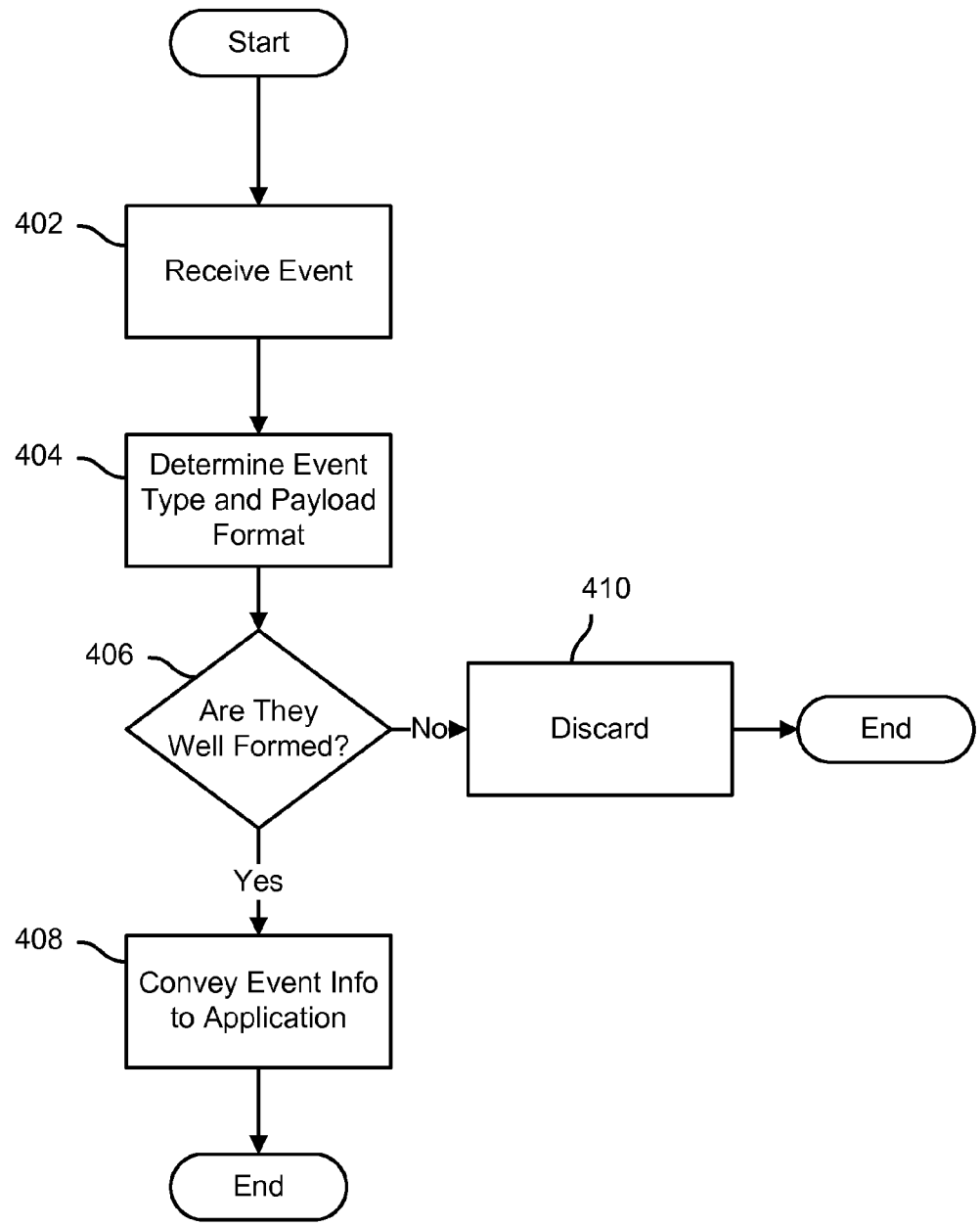
FIG. 4 is a flow chart illustrating an embodiment of a process for translating an event.

FIG. 4 is a flow chart illustrating an embodiment of a process for translating an event. The process depicted in FIG. 4 is an example of an implementation of portion 306 of FIG. 3. The process begins at 402 when an event is received, such as by event controller 214.

At 404, the event type and corresponding payload format for the event type are determined. If the event type and payload are well formed (406), at 408, the event information is conveyed to the appropriate document application(s). In some embodiments, to which document application the event information is conveyed depends on the context of the event. Suppose interface 150 includes both a customer-related business application and an equipment-related business application on the same page. When event controller 214 receives a broadcast event indicating that a customer has been selected, that information may be conveyed to document application 204. When event controller 214 receives a broadcast event indicating that a piece of equipment has been selected, that information may instead be conveyed to document application 206, as appropriate.

Whether or not the event type and payload are considered well formed can be based on a variety of factors. For example, in various embodiments, an ill formed event is one in which the data is corrupted, one in which the data is not in a recognized format, one that contains a syntax error or other error in the control portions of the message, etc.

At 410, if the event type and/or payload are not well formed, the event is discarded. In some embodiments, additional checks are performed at 406, such as whether the event and/or its payload pose a security risk. In such case, event controller 214 can be configured to discard the event at 410, rather than passing that information through to document application 204.

Linking Business Objects and Documents

As described above, in FIG. 1B, Alice is interacting in with portal 104 to learn more about the models of pumps manufactured by Acme. Documents in document repository 114 are linked with objects in business repository 110. As a result, when she selects a business object, such as pump P-1000-N001, she is shown automatically documents associated with that pump. Documents can be linked to business objects in a variety of ways. Additionally, multiple documents can be linked to the same business object and vice versa.

Figure 5:
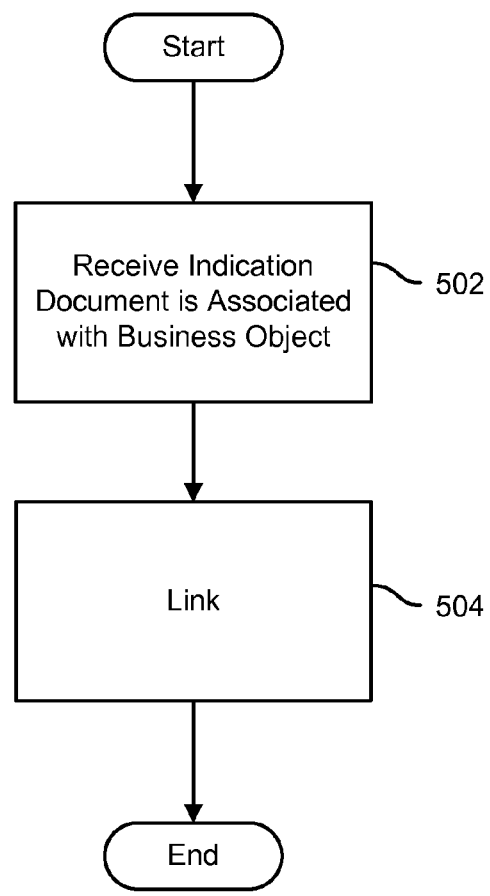
FIG. 5 is a flow chart illustrating an embodiment of a process for linking a document with a business object.

FIG. 5 is a flow chart illustrating an embodiment of a process for linking a document with a business object. In some embodiments, linking is performed automatically. In some embodiments, linking is performed manually, such as by an administrator or other user selecting region 168 of interface 150 shown in FIG. 1B. The process begins at 502 when an indication that a document is associated with a business object is received. At 504, the business object and the document are linked. As described in more detail below, in some embodiments, linking occurs through hard links. In other embodiments, linking occurs through soft links.

Documents can also be unlinked. For example, suppose every time Alice views a product known as Pump-2000, she is erroneously presented with company-wide sales figures from the year 2000. In such a case, a 'negative' link can be used to disassociate the business object from the irrelevant document.

Figure 6:
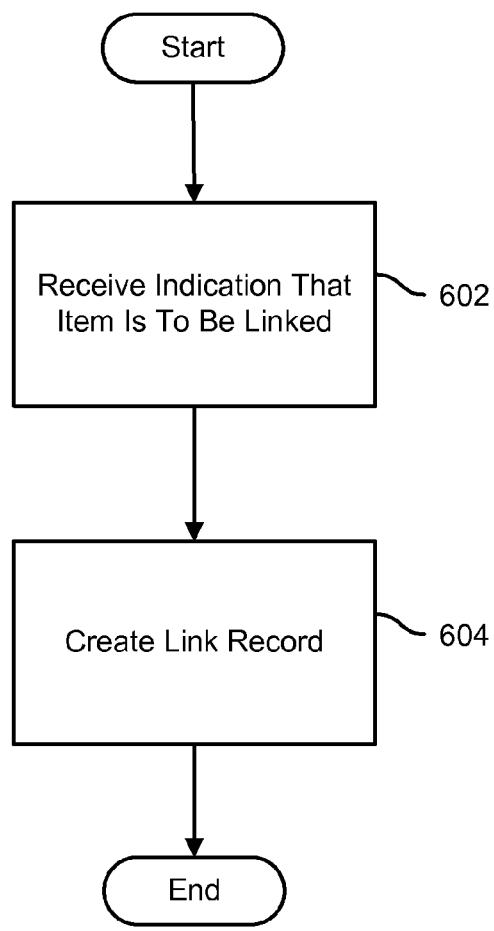
FIG. 6 is a flow chart illustrating an embodiment of a process for hard linking a document to a business object.

FIG. 6 is a flow chart illustrating an embodiment of a process for hard linking a document to a business object. In some embodiments the process of FIG. 6 is implemented by business server 108. The process may also be implemented by document server 112. The process begins at 602 when an indication that a document is to be linked is received. For example, an administrator using an interface provided by portal 104 provides an identification of a business object (e.g., a business object ID) at 602, along with an identification of a document (e.g., a document ID).

At 604, a link record is created. For example, at 604, a table is created (or updated) on business server 108 to include the business object ID in a row and the document ID in a column (or vice versa). In some embodiments, at 604, a table is created on document server 112 instead of or in addition to the table created on business server 108.

When documents are hard linked with business objects, if searching functionality is limited or unavailable, documents associated with business objects may nevertheless be located. For example, if portal server 116 malfunctions, documents associated with business objects may nevertheless be obtained by interfacing with document server 112 directly. Additionally, if a user or group of users has write access to only one of document repository 114 and business repository 110, they may nonetheless link documents and business objects by maintaining hard links on the server to which they do have access.

In some embodiments, the process shown in FIG. 6 is performed manually, such as by an administrator. In other embodiments, portions of the process shown in FIG. 6 are performed automatically. For example, as a background process that accepts as input a set of queries and instructions to hard link the results of the queries. Multiple sets of hard links can also be specified, for example, so that one group of users is presented with documents based on one set of hard links, and another group of users is presented with a different selection of documents when having selected the same business object.

Figure 7:
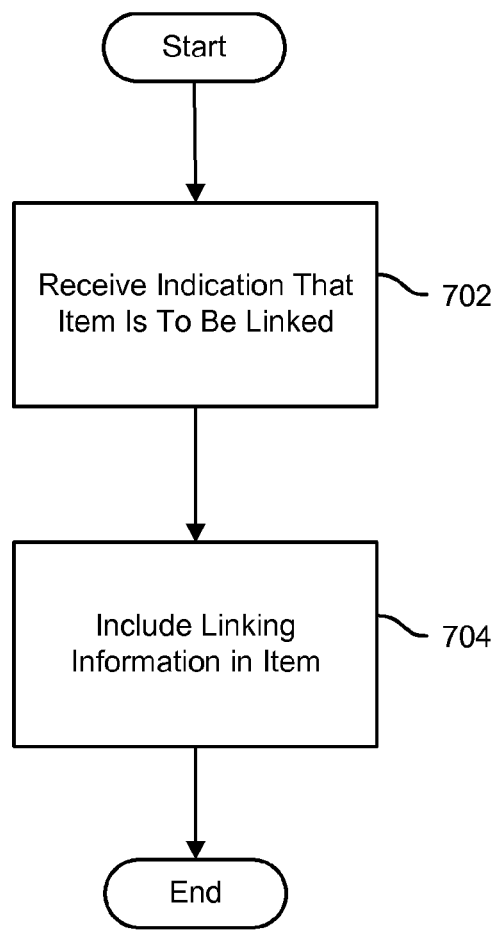
FIG. 7 is a flow chart illustrating an embodiment of a process for soft linking a document with a business object.

FIG. 7 is a flow chart illustrating an embodiment of a process for soft linking a document with a business object. In some embodiments the process of FIG. 7 is implemented by document server 112. The process begins at 702 when an indication that a document is to be linked is received. For example, an administrator using an interface provided by portal 104 provides an identification of a business object (e.g., a business object ID) at 702, along with an identification of a document (e.g., a document ID).

At 704, the document is updated to include information associated with the business object. For example, at 704, an attribute of the document (such as a 'related objects' field or other meta information) is updated to include the business object ID of the business object.

In some embodiments, the process shown in FIG. 7 is performed manually, such as by an administrator interacting with a portion of portal 104 reachable by selecting region 168 of interface 150 shown in FIG. 1B. A variety of additional methods may be used to perform portion 702 of the process shown in FIG. 7. For example, at the time a document is created, the document's author(s) can indicate to which business objects the document is related. For printed documents, such as invoices received in the mail, optical character recognition (OCR) can be used. For example, an administrator can specify that a particular line of a form (e.g., a customer number) is to be used as the business object ID to which the document is related. Which field is used and how it is to be inputted can be configured by document type. Thus, for example, invoices may rely on OCR of a particular line, whereas progress reports may include a barcode region which is scanned and decoded.

In some embodiments, the process shown in FIG. 7 is used in conjunction with a workflow. For example, suppose that Alice creates a sketch of an improved pump design. She submits the sketch to her supervisor. Once her supervisor has approved the sketch, the sketch is forwarded to the documentation department which links the sketch to the pump. In doing so, the documentation department (implicitly or explicitly) indicates that the approval process has been completed.

In various embodiments, portal 104 is configured to suggest business objects to which a document is related and/or should be linked. For example, after optical character recognition (OCR) has been performed with respect to an incoming document, natural language techniques and/or other heuristics can be employed to determine, for example, frequently used key words and a list of possible business objects from which a user can select association with are presented.

In some embodiments, portions 702 and 704 of the process shown in FIG. 7 happen concurrently with storage of the document in document repository 114. For example, suppose Alice receives test data from an outside party via email. When she submits the document to document repository, she may supply business object linking information at that time.

Displaying Context-Relevant Documents

In the example shown in FIG. 1B Alice did not specify any constraints on the types of documents to be shown to her in region 158. As a result, a list of all documents relating to pump P-1000-N001 was displayed. For a variety of reasons, Alice (or an administrator) may want to further define the context in which she views documents associated with business objects, the manner in which such documents and/or representation thereof are displayed, or a subset of potentially relevant content to which access is desired currently. For example, suppose at 170 in the interface shown in FIG. 1B Alice enters the keyword 'pump' instead of 'electric pump 001.' As a result, instead of two documents being shown in region 158, hundreds might be displayed, including documents from several different departments within Acme. Alice can narrow the listed documents in a variety of ways such as to a particular task at hand, such as compliance or research and development; a role, such as product marketing or sales; and a particular document type, such as drawings or reports; etc. Categories of documents that are inherently unrelated can be concealed and/or removed from region 158. For example, when viewing a customer data object (e.g., the records for a particular customer), such as by visiting region 172 of interface 150, the ability to select 'product documentation' is removed.

The contexts for which documents are to be displayed in interface 150 can be customized in a variety of ways. For example, templates can be created for particular job functions such that when a member of the marketing department logs into portal 104 and searches for pumps, the information shown to them will be different from the view that a member of the engineering department, such as Alice, will receive, with precisely the same query. A manager's view can include documents, such as unreviewed or as-yet-unapproved drafts of documents that would be hidden from the view of a typical employee and/or additional functionality, such as the ability to edit or approve a document can be added or removed, as applicable. Similarly, when a member of the finance department views a pump, invoices will be shown and information such as product manuals will not.

Figure 8:
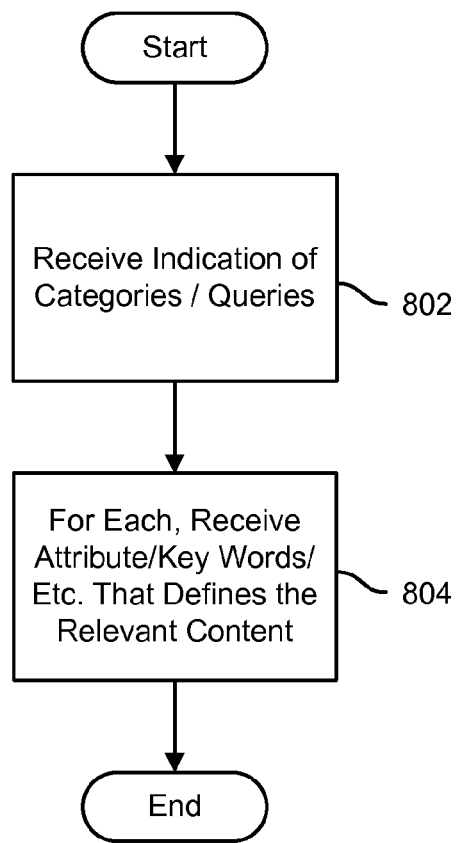
FIG. 8 is a flow chart illustrating an embodiment of a process for receiving configuration information.

FIG. 8 is a flow chart illustrating an embodiment of a process for receiving configuration information. In some embodiments the process is implemented by portal server 116. In some embodiments, the process of FIG. 8 is used to enable a different subset of context-related documents and/or other content to be presented to different users, and/or to the same user based on different menu selections and/or other indications of user preference and/or needs. The process begins at 802 when an indication of different categories/roles/types of queries is received. In the example shown, at 802 a list of each of the different roles within Acme (engineer, manager, salesman, etc.) is received. In some embodiments, other and/or different information, or a plurality of types of information, is received at 802. For example, in addition to or instead of receiving a list of roles, a list of locations (headquarters, Albuquerque field office, etc.), project types, task types, etc. is received.

At 804, attributes/keywords/meta information that help indicate to which of the categories specified in 802 a document or subset of documents belong are received. For example, at 804, a list of document types (e.g., invoice, design specification, etc.) is received and associated with the roles specified at 802. In some cases, the same attributes/keywords/meta information are associated with multiple roles. For example, an engineer role (or context) is associated with documents of types design specification and product manual, and a quality assurance role is associated with documents of type product manual, as well as customer surveys.

In the preceding example, in some embodiments an engineer who selected 'pump P-1000-N001' in a business application frame/window of a portal would be presented in a document application portal documents comprising design specifications and product manuals for pump P-1000-N001, whereas a quality assurance employee would be presented with product manuals and customer survey documents for pump P-1000-N001. In some embodiments, the content presented would be determined based at least in part on credential information associated with the current user, e.g., mapping a username to a role such as engineer or quality assurance. In some embodiments, a menu or other selection interface would be presented to enable a user to indicate the context-relevant content desired to be viewed and/or accessed, e.g, by selecting 'engineering' or 'quality assurance' from a drop down menu.

In various embodiments, the configuration information received in the process of FIG. 8 is received in the form of a configuration file, an administrative user interface, etc.

Figure 9:
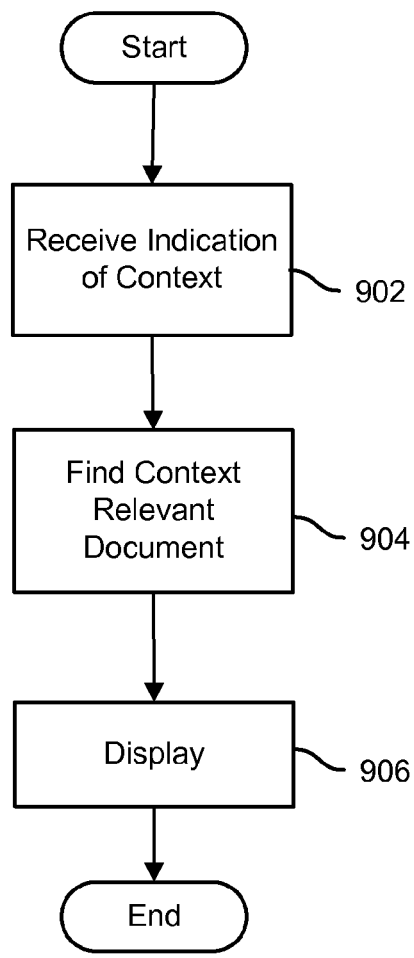
FIG. 9 is a flow chart illustrating an embodiment of a process for displaying context relevant content.

FIG. 9 is a flow chart illustrating an embodiment of a process for displaying context relevant content. The process begins at 902 when an indication of a context is received. For example, in the example described in conjunction with FIG. 1B, at 902, Alice selects checkbox 160. At 904, one or more context relevant documents is located. For example, at 904, document repository 114 is queried for documents having a hard link to the business object of pump P-1000-N001, and/or documents containing 'P-1000-N001' as a keyword in meta information associated with the document. At 906, documents found at 904 are displayed, for example through interface 150.

In some embodiments, additional credentials are required by document server 112 before certain actions (such as editing) or displaying certain documents are permitted. For example, suppose that in addition to documents 162 and 164 shown in FIG. 1B, document repository 114 contains a confidential research and design report that includes photographs of the pump as used by customers in proprietary configurations. While a casual user of portal 104 may be authorized to view documents 162 and 164, they should not be allowed to gain access to the confidential report. In such case, Alice can be challenged for credentials associated with document server 114, such as via a popup dialogue. In some embodiments, Alice's credentials are stored by portal 104 and Alice is automatically granted an appropriate level of access to the contents of document repository 114 and business repository 110.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing content comprising:
  receiving a user input via a portal interface associated with a business application indicating that a content item comprising a body of managed content is associated with a business object not included in the body of managed content, wherein the business application is configured to provide access to the business object;
  linking, using a processor, the content item to a business object identifier identifying the business object, the business object identifier capable of being linked to each of a plurality of content items identifying the business object; and
  automatically accessing the content item by querying for the business object identifier identifying the business object using a content management system configured to provide access to the body of managed content, wherein the querying of the content management system includes broadcasting the business object identifier by the business application to the content management system, and wherein the content management system can be configured to listen or ignore the broadcast, and wherein the business object identifier is used to access a link directly linking the business object identifier to a content item identifier identifying the content item, and wherein the link comprises one or more of:
   a hard link comprising a table entry that includes the business object identifier in a row and the content item identifier in a column or the business object identifier in a column and the content item identifier in a row, and
   a soft link comprising an attribute included in metadata associated with the content item.

2. The method of claim 1 wherein the hard link is accessible alternatively by interfacing with a document server without broadcasting the business object identifier by the business application.

3. The method of claim 1 wherein the hard link is accessible from a business server.

4. The method of claim 1 wherein the linking is performed manually.

5. The method of claim 1 wherein the linking is performed automatically.

6. The method of claim 1 wherein the content item is retrieved automatically when the business object is retrieved.

7. The method of claim 1, wherein one or more of the plurality of content items are retrieved when the business object is retrieved.

8. The method of claim 1, further including receiving, as a broadcast from a business server which stores the business object, an indication that the business object is retrieved, and retrieving the content item automatically based on the broadcasted indication.

9. The method of claim 1, wherein the business object is stored in a business repository, and wherein the content item is stored in a document repository, and wherein the business repository and the document repository are different repositories.

10. A system for managing content comprising a processor and a memory coupled with the processor, the memory configured to provide the processor with instructions which when executed cause the processor to:
   receive a user input via a portal interface associated with a business application indicating that a content item comprising a body of managed content is associated with a business object not included in the body of managed content, wherein the business application is configured to provide access to the business object;
   link the content item to a business object identifier identifying the business object, the business object identifier capable of being linked to each of a plurality of content items identifying the business object; and
   automatically access the content item by querying for the business object identifier identifying the business object using a content management system configured to provide access to the body of managed content, wherein the querying of the content management system includes broadcasting the business object identifier by the business application to the content management system, and wherein the content management system can be configured to listen or ignore the broadcast, and wherein the business object identifier is used to access a link directly linking the business object identifier to a content item identifier identifying the content item, and wherein the link comprises one or more of:
      a hard link comprising a table entry that includes the business object identifier in a row and the content item identifier in a column or the business object identifier in a column and the content item identifier in a row, and
      a soft link comprising an attribute included in metadata associated with the content item.

11. The system of claim 10 wherein the hard link is accessible alternatively by interfacing with a document server without broadcasting the business object identifier by the business application.

12. The system of claim 10 wherein the hard link is accessible from a business server.

13. The system of claim 10, wherein the business object is stored in a business repository, and wherein the content item is stored in a document repository, and wherein the business repository and the document repository are different repositories.

14. The system of claim 10, wherein one or more of the plurality of content items are retrieved when the business object is retrieved.

15. The system of claim 10, wherein the memory is further configured to provide the processor with instructions which when executed cause the processor to:
   receive, as a broadcast from a business server which stores the business object, an indication that the business object is retrieved, and retrieve the content item automatically based at least in part on the broadcasted indication.

16. A computer program product for managing content the computer program product being embodied in a non-transitory computer readable storage medium and comprising computer instructions for:
   receiving a user input via a portal interface associated with a business application indicating that a content item comprising a body of managed content identifies a business object not included in the body of managed content, wherein the business application is configured to provide access to the business object;
   linking the content item to a business object identifier identifying the business object, the business object identifier capable of being linked to each of a plurality of content items identifying the business object; and
   automatically accessing the content item by querying for the business object identifier identifying the business object using a content management system configured to provide access to the body of managed content, wherein the querying of the content management system includes broadcasting the business object identifier by the business application to the content management system, and wherein the content management system can be configured to listen or ignore the broadcast, and wherein the business object identifier is used to access a link directly linking the business object identifier to a content item identifier identifying the content item, and wherein the link comprises one or more of:
      a hard link comprising a table entry that includes the business object identifier in a row and the content item identifier in a column or the business object identifier in a column and the content item identifier in a row, and
      a soft link comprising an attribute included in metadata associated with the content item.

17. The computer program product as recited in claim 16 wherein the linking is performed automatically.

18. The computer program product of claim 16, wherein the business object is stored in a business repository, and wherein the content item is stored in a document repository, and wherein the business repository and the document repository are different repositories.

19. The computer program product of claim 16, wherein one or more of the plurality of content items are retrieved when the business object is retrieved.

20. The computer program product recited in claim 16, further comprising computer instructions for receiving, as a broadcast from a business server which stores the business object, an indication that the business object is retrieved, and retrieving the content item automatically based at least in part on the broadcasted indication.

* * * * *